United States Patent [19]

McCalmont et al.

[11] 4,433,211

[45] Feb. 21, 1984

[54] PRIVACY COMMUNICATION SYSTEM EMPLOYING TIME/FREQUENCY TRANSFORMATION

[75] Inventors: Arnold M. McCalmont, Acton; Matthew W. Slate, Sudbury, both of Mass.

[73] Assignee: Technical Communications Corporation, Concord, Mass.

[21] Appl. No.: 317,947

[22] Filed: Nov. 4, 1981

[51] Int. Cl.³ .......................... H04K 1/06; H04L 9/00

[52] U.S. Cl. .............................. 179/1.5 S; 179/1.5 R; 178/22.04

[58] Field of Search .......... 179/1.5 R, 1.5 S, 15.55 R; 178/22.04, 22.05

[56] References Cited

U.S. PATENT DOCUMENTS

| | | | |
|---|---|---|---|
| 3,723,878 | 3/1973 | Miller | 179/1.5 R |
| 3,773,977 | 1/1973 | Guanella | 178/22.04 |
| 3,921,151 | 11/1975 | Guanella | 178/22.04 |
| 3,970,790 | 7/1976 | Guanella | 178/22.04 |
| 4,020,285 | 4/1977 | Branscome et al. | 179/1.5 R |
| 4,058,677 | 11/1977 | Maitland et al. | 179/1.5 S |
| 4,068,094 | 1/1978 | Schmid et al. | 179/1.5 R |
| 4,071,707 | 1/1978 | Graf et al. | 179/15.55 R |
| 4,179,035 | 4/1979 | Frutiger | 178/22.05 |
| 4,217,469 | 8/1980 | Martelli | 178/22.04 |
| 4,221,931 | 9/1980 | Seiler | 178/22.04 |

*Primary Examiner*—Sal Cangialosi

*Attorney, Agent, or Firm*—Cesari and McKenna

[57] ABSTRACT

A privacy communication system digitizes a voice signal and divides the signal into different frequency bands or time segments and shifts the bands or segments in frequency and/or time under control of a continually changing pseudo-random key word to develop an encrypted transmitted signal having the same time/bandwidth product as the voice signal.

24 Claims, 3 Drawing Figures

PRIVACY COMMUNICATION SYSTEM EMPLOYING TIME/FREQUENCY TRANSFORMATION

BACKGROUND OF THE INVENTION

This invention relates to a privacy communication system. It relates more particularly to an audio or voice scrambler in which a communication is rendered unintelligible so that its content is unavailable to third parties, the communication being capable of being unscrambled after reception by an authorized person to recover the original voice content.

DESCRIPTION OF THE PRIOR ART

Privacy systems are in widespread use for rendering audio signals, particularly voice signals, unintelligible for transmission over an exposed transmission link such as a telephone line so as to maintain the transmission private, specifically to avoid reconstruction of the voice content by unauthorized listeners. In such systems, the voice signals are typically encoded at a transmitting site using an encoding technique that involves scrambling or displacing the audio signals in the frequency domain, time domain or both. At the receiving site, the scrambled signals are decoded by, in effect, reversing the encoding procedure to recover the original audio signals. Ideally, in any system of this type, the encoding technique used should make it extremely difficult for unauthorized listeners to decode or "break" an intercepted scrambled signal, yet still permit recovery of the transmitted information at the receiving site with good intelligibility and recognition by authorized listeners.

One proposed technique used to scramble voice information, disclosed in U.S. Pat. No. 3,921,151 and 3,970,790, for example, is to divide the transmitted signal into segments of equal time duration. The individual signal elements are applied to a memory for temporary storage. The stored segments are then read out from memory in a random pattern as determined by a signal from a pseudo-random key code generator so as to scramble the order of the segments. They are transmitted in this scrambled order and momentarily stored at the receiving end, where the process is effectively reversed to descramble the signal elements. The former patent adds an additional element of randomness to the communication by time-reversing selected signal segments according to the output from the pseudo-random key code generator.

Attempts have been made to increase the security of privacy systems by dividing the audio signal to be transmitted in frequency as well as in time to further scramble the transmitted signal. Arrangements such as this are disclosed in U.S. Pat. Nos. 4,149,035 and 4,221,931. Basically, the audio signal is divided into two or more different frequency bands with the information in each band being digitized. Then each band is partitioned into a number of segments of equal time duration and these segments are transposed both within the same band and with segments in the other bands in accordance with a code developed by a pseudo-random key generator. The signals are then converted back to analog form and combined for transmission to the receiving site, which contains similar equipment for reversing the above procedure to recover the original audio signal. The system in the last-mentioned patent also timewise reverses certain of the signal segments in accordance with a second key code developed by the key generator to obtain an additional element of randomness in the scrambled signal. Even so, however, it may still be possible for unauthorized listeners to decode or break an intercepted scrambled signal such as by analyzing the cadence and detecting recurring phenomena in the transmitted scrambled signal using present-day high-speed computers.

SUMMARY OF THE INVENTION

It is therefore an object of the present invention to provide a privacy communication system having the ability to transmit scrambled audio signals with increased security.

It is a further object of the invention to provide a system such as this in which the random nature of the scrambling of the audio signal is materially increased to reduce the periodicity of the transmitted signal sequences.

Yet another object of the invention is to provide a secure communication system whose scrambled signals can be transmitted over a channel having no greater bandwidth than that required for the original audio signal.

A further object is to provide such a system which produces good quality in the received "clear" audio signal.

Still another object of the invention is to provide a secure communication system which is relatively simple in construction, yet quite efficient and reliable in operation.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

The present system has particular applicability to achieving high level communications security for audio bands in the speech frequency spectrum or channel extending from around 200 Hz to about 3000 Hz. To accomplish this, the system divides the analog audio input signal into two or more frequency bands, preferably of equal bandwidth. In general, one or more of the bands are transposed so that all the bands end up in the same low-frequency range. In the usual case, this is accomplished by separately transposing the bands above the lowest frequency band to the frequency range of the low band. The frequencies of one or more of the bands may also be inverted. At this point, the system has produced a set of "frequency segments" all of which are now in the same low-frequency band, but which represent information originally contained in different frequency bands. The signals in the respective frequency segments are then individually digitized and stored in a memory for digital processing. Such processing divides the frequency segments as a group into a set of successive "time blocks". Each of the frequency segments is thus divided into a succession of time segments, with each time block containing a number of these frequency-time segments equal to the number of frequency bands into which the original signal was divided.

Each such segment is read out of memory at a rate which is n times the rate that it was written into memory, where n is equal to the number of frequency-time segments in each block. This compresses each segment in time by a factor of 1/n and expands it in frequency by a factor of n so that each segment now occupies 1/n times the time interval and has n times the bandwidth that it did prior to processing. That is, it has a bandwidth equal to the entire bandwidth of the original input signal. Accordingly, each segment retains its original time-bandwidth product.

For example, if the original audio channel has been divided into two frequency bands, each segment would be expanded in frequency by a factor of 2 and compressed in time by a factor of 2. Thus, when all the segments derived from an input signal have been retrieved from memory, they have collectively the same bandwidth and duration as the input signal. If the input signal were divided into five bands, the expansion and compression factor would be 5.

The time-compressed digitized segments are read out of memory under the control of a long, nonlinear pseudo-random key code developed by a key generator. The code determines the length of each time block and the order in which the segments within the block are retrieved. Furthermore, each frequency-time segment may be reversed or not reversed in time as it is read out of memory according to the key code. The digital signal thus obtained is converted to analog form for transmission to the reception site.

This scrambling process is repeated on successive increments of the audio signal being transmitted, the audio signal being (1) divided into a plurality of frequency bands, (2) further segmented in time, and (3) compressed in time and expanded in frequency, with such time-compressed, digitally represented segments being reordered in time under control of the key generator, returned to analog form and transmitted. Furthermore, the key code for encoding each successive audio signal block is developed pseudo-randomly so as to provide continual change in the encryption permutation applied to the input signal.

A receiving unit at the receiving site detects the transmitted analog signal and converts it to digital form. Then the above described scrambling process is carried out in reverse under control of a synchronized pseudo-random key generator and the recovered or clear signal is reconverted from digital to analog form so that it is intelligible to the authorized listener.

Thus the compression time-wise and concomitant expansion in the frequency spectrum of selected frequency-time segments derived from different frequency bands of the original audio signal, accompanied by the random time reversal and reordering of those segments in time, yields a transmitted signal which is extremely difficult to decode or break. Yet when the reverse algorithm is applied to the incoming signal at the receiving site, there results a received audio signal which contains substantially all of the intelligence of its original counterpart. Furthermore, since the transmitted signal has the same time-bandwidth product as the original audio signal, the transmitted signal requires no wider bandwidth than is required for the original audio signal.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
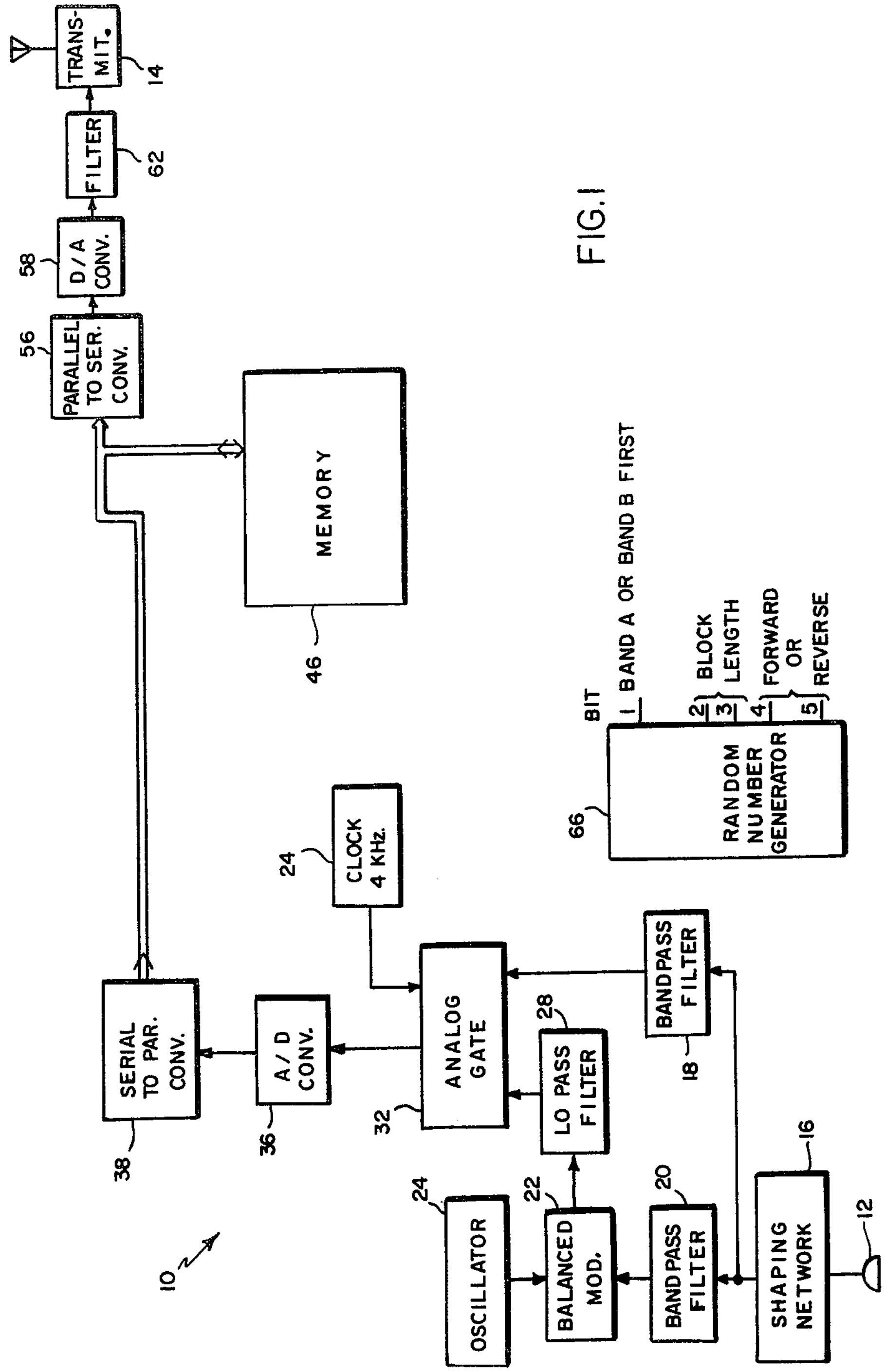
FIG. 1 is a functional block diagram of one end of the privacy communication system made in accordance with this invention.

Refer now to FIG. 1, which illustrates the transmitting end of a privacy communication system which accomplishes time/frequency transformation in accordance with this invention. The system, shown generally at 10, is interposed between an audio signal source 12, a microphone for example, and a transmitter 14. The audio signal from source 12 is applied to a wave shaping network 16 for filtering out signal components which may lie outside the bandwidth of the transmission channel. For example, when speech is to be transmitted, the network 16 may include filter elements which attenuate at frequencies below about 300 Hz and above about 2500 Hz.

After passage through the network 16, the audio signal is applied to bandpass filters 18 and 20, which divide the signal into two bands. In the illustrated system, filter 18 passes only those frequency components of the audio signal from about 300 Hz to 1150 Hz.

The filter 20 passes only those frequency components from about 1550 up to 2500 Hz. The audio signal is thus split by the system 10 into a high frequency Band A and a low frequency Band B. A gap is thus provided between the two passbands to form a guard band so that effective filtering of the two passbands takes place. This improves the quality of the transmitted signal without appreciably degrading its information content.

The high frequency band signal passed by the filter 20 is frequency shifted approximately to the lower band. It is also inverted in frequency so that the frequency distribution of the inverted form of that higher frequency band resembles that of the lower frequency band. The resultant signal has an amplitude distribution that is more regular than that of a normal speech signal. Therefore, it is more difficult for an unauthorized listener to extract cadence information from a transmission that may facilitate "breaking" the transmission.

To effect the frequency translation and inversion, the output of filter 20 is applied to a balanced modulator 22 where it is modulated with a square wave derived from a system clock 24. For voice signals of the type herein involved, the frequency of the square wave is selected to be approximately 2700 Hz. The output of modulator 22 is applied to a low-pass filter 28 which passes only the lower sideband portion of that signal which is a replica of signal component in Band A, but extending in frequency from 1150 down to 300 Hz.

The signals from filters 18 and 28 are both applied to an analog gate 32. Gate 32 is gated by a signal from a system clock so that the gate alternately passes the voltages from the filters 18 and 28. In the present instance, a sampling rate of 3.90625 KHz (hereinafter rounded off to 3.9 KHz) is employed. In other words, the clock signal applied to gate 32 is about 3.9 KHz. Thus, there appears at the output of gate 32 a string of voltage samples which are selected alternately from Band A and Band B. These samples are applied to an analog-to-digital converter 36 which converts each successive sample into a serial 8-bit binary representation. The digital output from converter 36 is then applied by way of a serial-to-parallel converter 38 to a conventional digital random access memory 46. Typically, memory has 4096 locations, each location containing a signal sample.

When a secure transmission commences, the system generates a series of WRITE signals. At the first such signal, a WRITE address is applied to the memory 46 to address the first location in memory 46 so that the first 8-bit signal sample derived from frequency Band A is loaded into that section location. At the next WRITE signal, the next WRITE address is applied to memory 46 and the first sample from Band B is written into the next memory 46 location. The third WRITE signal causes the next sample from Band A to be stored into the third memory 46 location, and so on.

During writing, then, the successively addressed locations in memory 46 receive samples alternatively from Band A and Band B, corresponding to the successively sampled voltages appearing at the output of gate 32. Since gate 32 samples each band at a 3.9 KHz rate, e.g. every 256 microseconds, an 8-bit word representing a voltage sample from either Band A or Band B is loaded into memory 46 at a rate of 7.8 KHz or every 128 microseconds.

In accordance with the illustrated system, after sufficient data has been written into memory 46, the system initiates a READ routine and generates a series of READ signals. Upon the occurrence of each such signal, an 8-bit word is read out of memory 46. The WRITE and READ signals alternate so that data is retrieved from memory concurrently with the storage of new signal data.

The successive digitized signal samples read out of memory 46 are applied via a parallel-to-serial converter 56 to a digital-to-analog converter 58. Converter 58 converts the successive samples to successive voltages that are applied to a lowpass filter 62. The output of the filter 62 is a scrambled audio signal that is fed to the transmitter 14 for transmission to a remote receiver.

The signal scrambling accomplished by the illustrated embodiment of the invention takes place in the READ routines that retrieve the stored signal samples from the memory 46. During these routines, signals derived from frequency Bands A and B are retrieved from memory 46 in a pseudo-random fashion with respect to (a) the lengths or time durations of the segments (b) the order of the segments, i.e., from Band A and then Band B, or vice versa, and (c) their direction, i.e. forward with time or reversed.

More specifically, retrieval from memory is divided into blocks, each of which, in the present example, contains two equal length segments representing the Band A and Band B components of the original audio signal. Since the blocks can have different lengths, it is obvious that while the segments in a given block are of equal length, the segments in different blocks can have different lengths.

Figure 3:
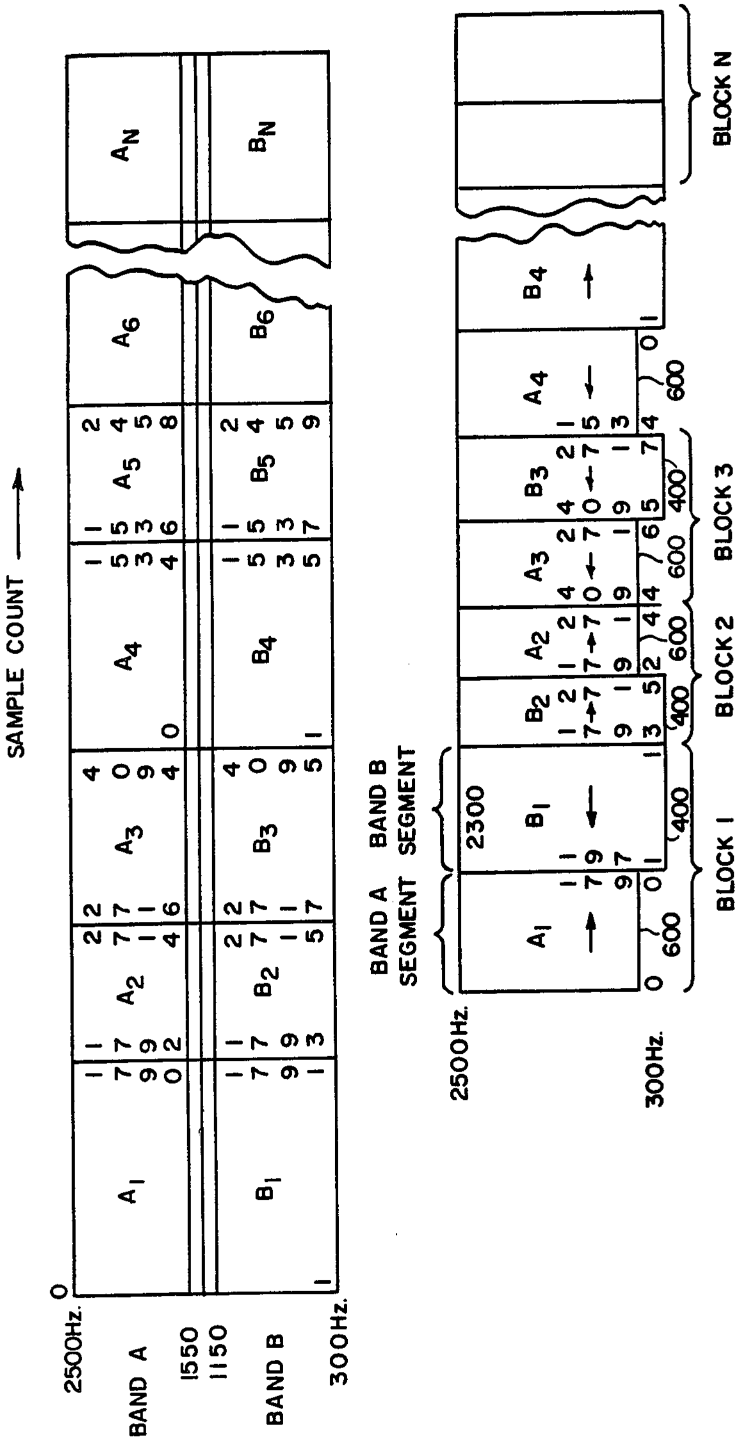
FIG. 3 is a diagrammatic view illustrating the operation of the FIG. 1 system.

Since the samples in each segment are read out of memory 46 in succession (whereas they were loaded into the memory alternately with samples from the other frequency band), they come out for transmission at a rate which is twice the read-in rate, i.e. 7.8 KHz vice 3.9 KHz. This compresses each segment in time by a factor of two and doubles its frequency. However, the time-bandwidth product is the same as that of the original audio signal component. This is illustrated diagrammatically in FIG. 3. As shown there, the original audio signal is divided into two bands, i.e. Band A and Band B. Band A is divided into sample time-segments A1, A2, A3, . . . AN which may be of different lengths. Band B is likewise divided into time segments B1, B2, B3, . . . BN. During the READ routines, corresponding segments from each band are compressed in time and expanded in frequency and comprise successive blocks, i.e. segments A1, and B1, form Block 1; segments A2 and B2 comprise Block 2, and so on. Those blocks are then transmitted. Each block and the segments it comprises can have different lengths as shown. Also the two segments forming each block can be read out for transmission in either order and in the forward or reverse direction timewise as shown by the arrows in FIG. 3. Thus, for example, in Block 1, the segment A1, is transmitted in the forward direction, followed by segment B1 the reverse direction. In Block 2, segment B2 is transmitted before segment A2 and both segments are transmitted in the forward direction. Also, as is apparent from FIG. 3, Block 2 is shorter than Block 1. The remaining blocks comprising the audio signal are formed and transmitted in a similar fashion. FIG. 3 shows that, in all cases, each segment has the same time-bandwidth product after scrambling as it did before scrambling.

In the present system, the segment read-out order and direction as well as the length of each segment are under the control of a random number key code generator 66. More particularly, before each block of samples is stored in memory 46 for transmission, a new five-bit pseudo-random number from the generator 66 is applied to various circuit elements to determine the manner in which the segments in that block are to be arranged. The first bit of the key number determines the order in which the two segments comprising that block are to be read out. If the first bit has one value, say, ZERO, then the Band A segment is read out before the Band B segment in that block, i.e., see Block 1 in FIG. 3. On the other hand, if the first bit has a value ONE, then the Band B segment is read out before the Band A segment, viz. Block 2 in FIG. 3.

The second and third bits in the pseudo-random number produced by generator 66 determine the block length. With two bits, four different block lengths can be selected. In the present system, the four block lengths are 1024, 1280, 1536 and 1792 signal samples.

Bits 4 and 5 of the pseudo-random number determine the direction in which each of the segments in the block will be read out of memory 46, i.e. in the forward or reverse direction. That is, if bit 4 is a ZERO, the first segment of the block is read out forwardly as shown in Block 1 in FIG. 3; if it is a ONE, that segment is read out in reverse as depicted in Block 3. Similarly, the second segment is read out forwardly or in reverse depending upon whether bit 5 is a ZERO or a ONE.

As is customary in secure communications systems of this general type, an initial synchronization signal is transmitted in order to synchronize the section of the system at the transmitter with the comparable section at the receiver. Also, at that time, the system is initialized to reset the various components of the system. Then the WRITE routine commences as described above so that a succession of Band A and Band B signal samples are loaded alternately into successive addresses in memory 46.

Figure 2:
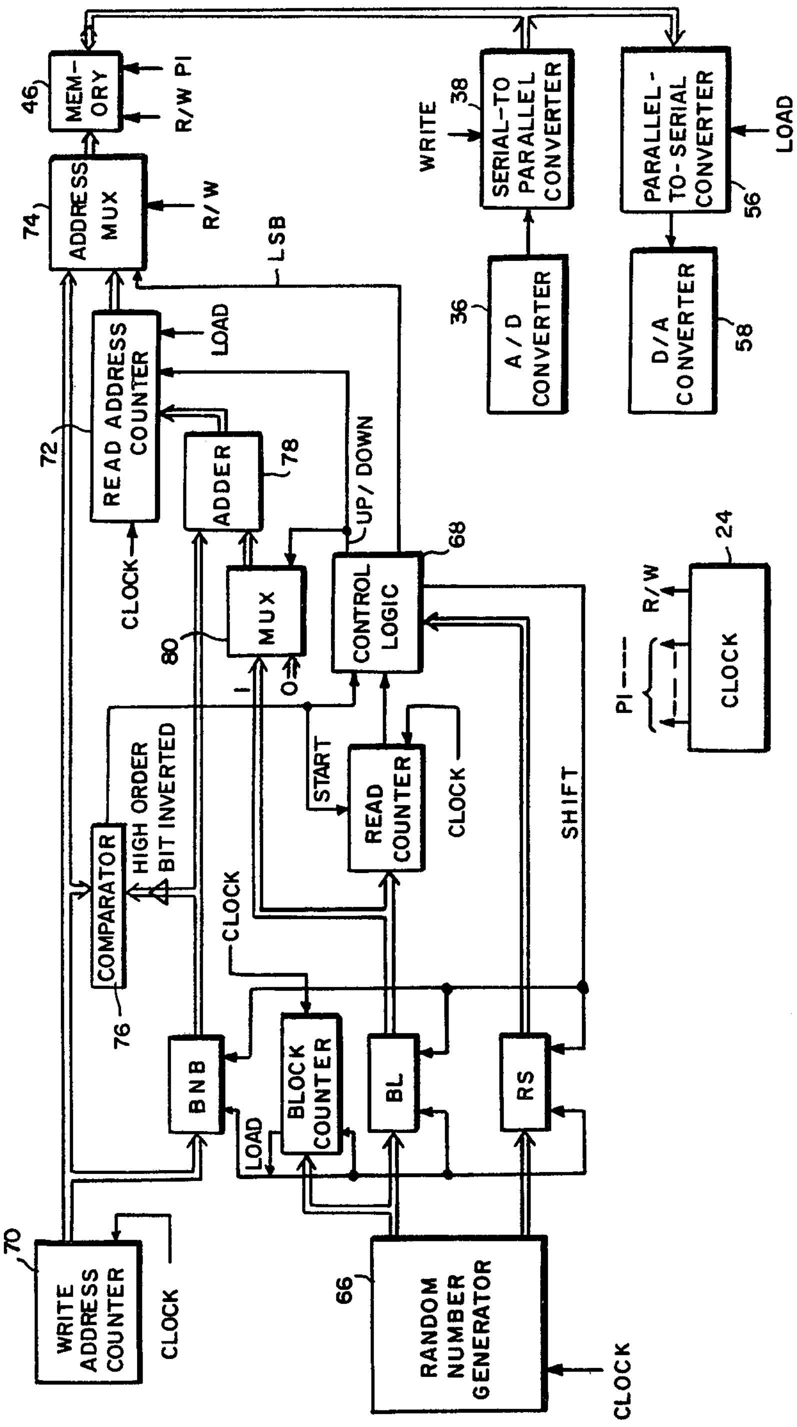
FIG. 2 is a detailed block diagram of the scrambling circuitry used in the system of FIG. 1.

FIG. 2 depicts in block form a circuit that operates in accordance with the flow chart of FIG. 2 during signal transmission. The block 24 of FIG. 1 continually provides alternate READ and WRITE signals that condition the circuitry for alternately writing signal samples into the memory 46 and retrieving them from the memory. The clock, which is of conventional design, also provides, during the read and write intervals, a series of phase pulses P1, P2, etc. A control logic unit 68 provides the control signals for the various other units in FIG. 2. For example, it provides the "load" signals for the counters and registers, as well as other signals described below. It comprises a conventional assemblage of flip-flops and gating circuits that pass various timing pulses from the clock 24 and other signals whose timing is derived in part from the clock. The details of these circuits will not add to an understanding of the invention and they are omitted from this description for the sake of clarity.

The memory 46 is addressed by a write counter 70 for the write operations. For read operations, it is addressed by a concatenation of the read counter 72 and a single bit from the logic unit 68 as described below. The contents of the counters 70 and 72 are applied to the address port of the memory 46 by way of a multiplexer 74 under control of the READ and WRITE signals. That is, when the WRITE signal is asserted, the multiplexer connects the write counter 70 to the address port and when the WRITE signal is not asserted, i.e. when the READ signal is asserted, the multiplexer 74 connects the read counter 72 and the single bit from logic unit 68 to the memory 46 address port. The memory 46 is connected to a data bus 73 to which the serial-to-parallel converter 38 and the parallel-to-serial converter 58 are also connected. The memory and the converter 58 are coupled to the bus 73 by the WRITE signal. The READ signal and a P pulse cause the converter 58 to receive data from the bus 73 during the read operations of the memory. The WRITE signal is also used as a read/write control signal for the memory 46. Each memory operation is triggered by a P1 pulse from the clock 42.

In accordance with the algorithm described above, a FIFO register BL receives the two bits from generator 66 indicating the block length for readout operations; a second FIFO register RS receives random number bits 1, 4 and 5 that determine segment sequence and reversal of the readout operations for each block; and a third FIFO register BNB receives the four most significant bits of the beginning address of each block being written into the memory 46.

The binary representations of the four block lengths listed above are provided directly by the two block length bits in the register BL. Specifically, the latter bits are used as bits 8 and 9 in the block length number, a ONE is inserted as bit 10 and the lower order bits are all ZEROS. For a memory capacity of 4096 locations, 12 bits (i.e. bits 0–11) are needed for the memory address function. The beginning address of each block will contain ZEROS for bits 0–7. Accordingly, generation of beginning addresses of blocks and other operations relating to beginning addresses involve only the four most significant bits, i.e. bits 8–11. Therefore, these operations, as well as storage of the beginning addresses, can be performed by 4-bit circuitry.

The circuitry depicted in FIG. 2 operates as follows. On synchronization, the various registers are cleared, the first pseudo-random number from the generator 66 is loaded into the registers BL and RS and, the block length is loaded into a block counter 75. The BNB FIFO register contains the beginning address of the first block, i.e. 0000. In response to clock pulses the write counter 70 provides a succession of memory addresses for storage of the signal samples from the converter 38. However, the read operations are inhibited by the logic unit 68, e.g. by preventing "load" pulses from reaching the counter 56.

The block counter 75 counts down in response to the pulses that advance the write counter 70. It thus reaches ZERO when the first block of samples has been stored in the memory 46. It thereupon emits an output signal that causes the next random number to be loaded into the registers BL and RS, with the new block length from the generator 66 also being loaded into the counter 75. The same output signal also causes the count in write counter 70 to be loaded into the BNB register. This address is the beginning address of the second block.

This operation continues indefinitely, with a succession of pseudo-random numbers being loaded into the registers BL and RS and block-beginning addresses being loaded into the BNB register. The contents of these registers are used in the memory retrieval operations, which will now be described.

More specifically, the address in the BNB register, with the most significant bit inverted, is applied to a comparator 76. The bit inversion effectively advances the address by 2048. Thus, with the BNB register initially cleared, the address 2048 is applied to the comparator 76. The other input to the comparator is the content of the write counter 70.

Accordingly, when 2048 signal samples have been stored in the memory 46, the counter 70 advances to a count of 2048 and the comparator 76 emits an output signal to the logic unit 68. The logic unit thereupon initiates the read operations.

If bit 4 of the pseudo-random number contained in output stages of the BL and RS registers is a ZERO, indicating forward retrieval of the first segment in the block, the beginning address of the block is loaded into the read counter 72. Specifically, the counter 72 receives the output of an adder 78, which sums the address in the output stage of the BNB register with the output of a multiplexer 80. If random number bit 4 is a ZERO, an UP/DOWN signal from the logic unit 68 causes the multiplexer 80 to select zero as its input and the adder 78 thus passes the block beginning address in the BNB register to the counter 12.

If random number bit 4 is a ONE, the last address in the block is loaded into the read counter 72 for retrieval in the reverse direction. The state of the UP/DOWN signal causes the multiplexer 80 to select the block length from the BL register. However, the sum of the block length and the block beginning address, as provided by straight addition in the adder 78, is the beginning address of the next block. This can be converted to the last address in the present block in either of two ways. One of these is to load the sum into the read counter 72 and then decrement the counter before the counter begins addressing the memory 46. The second arrangement, accomplished by additional circuitry (not shown), is to subtract the block length increment (256 in the present example) from the block length, the block beginning address or the sum of the two, and preset all the lower order bits in the counter 72 to ones.

The UP/DOWN signal from the logic unit 68 also controls the direction in which the read address counter 72 counts. That is, if random number bit 4 is a ZERO, the UP/DOWN signal causes the counter to count up and if that bit is a ONE, it causes it to count down, thereby providing the required forward or reverse retrieval from the memory 46.

As mentioned above, the least significant bit of the memory address for retrieval operations is provided by the logic unit 68. This bit is derived from bit 1 of the random number, as contained in the RS register, and specifically if this bit is a ZERO, the first segment of the block being retrieved from memory will be the A segment, which is contained in every memory addresses. Accordingly the least significant bit (LSB) provided by the logic unit 68 is a ZERO. Conversely, if random number bit 1 is a ONE, the least significant bit of the memory address will be a ONE during retrieval of the first segment, thereby providing retrieval of the B segment, which resides in the odd numbered addresses.

Also, at this time, a read counter 83 is loaded with one-half the block length.

The read operation begins immediately and runs in synchronism with the write operation. Each time the read address counter 72 is incremented or decremented to provide a new memory address, it changes the address by a count of 2, thereby providing only even or odd addresses, in accordance with random number bit 1. At the same time, the read counter 83 is decremented. When the read counter reaches the end of the segment A or B being retrieved from the memory 46, the write counter 83 will have counted down to zero. The resulting signal from the counter 83 is applied to the control logic unit 68 which responds by setting up the read address counter 72 to retrieve the second segment in the block.

Specifically, the logic unit generates a new UP/-DOWN signal corresponding to bit 5 of the random number and accordingly causes the read address counter 72 to be loaded with the beginning address or the last address of the block, depending on whether bit 5 indicates that the second segment of the block is to be retrieved in the forward or reverse directon. The logic unit 68 also inverts the least significant bit of the memory address so that if the segment contained in the even numbered addresses of the block was the first segment retrieved, the segment contained in the odd numbered addresses will now be retrieved, and vice versa. The retrieval operation then continues so as to retrieve from the memory 46 the second segment in the block.

When retrieval of the second segment has been completed, the write operation will have addressed 2048 locations beyond the end of the block from which data is being retrieved and the comparator 76 will therefore emit another output signal. This signal causes the logic unit to shift the next pseudo-random number to the output stages of the BL and RS registers and shift the beginning address of the next block to be retrieved to the output stage of the BNB register. The logic unit 68 then operates as described above to initiate retrieval of the first segment of the next block.

This sequence continues as long as the secure transmission persists. That is, the system writes sample data into memory 46 alternately from Band A and Band B and then retrieves that data out of the memory and transmits it with a system delay corresponding to 2048 samples. The samples are retrieved from the memory in successive data blocks having one of four selected lengths as determined by the key word produced by generator 66 prior to transmission of each new block. Furthermore, the same key word determines the order in which the Band A and Band B data segments comprising that block are transmitted and whether each such segment is read out and transmitted in the forward or reverse direction. Resultantly, the transmission from system 10 is reasonably secure. Yet the transmitted scrambled signal can be recovered easily at the receiving location by a comparable system operating in synchronism with generator 66.

It will be apparent from the foregoing that a larger number of bits in the key word will permit a larger selection of possible block lengths. It should also be appreciated that the audio signal can be divided into more than two frequency bands. Furthermore, the segments in adjacent frequency bands can have coincident-in-time boundaries, as described herein, or the different bands may be asynchronously divided into segments that do not coincide in time. Still further, the signal samples can be scrambled as they are being read into memory section 42 rather than during readout as specifically described herein.

It is also quite feasible to reverse the order of the processes that are carried out to encrypt the audio signal to be transmitted. For example, the audio signal can be partitioned into segments of different time duration before it is divided into different frequency bands rather than the reverse as specifically described above. In other words, after the entire frequency spectrum of the audio signal is divided into segments of different time duration, each such segment can be digitized and stored in memory. The stored information may then be read out of memory at a slower rate equal to the reciprocal of the rate at which it was read into the memory. This effectively expands each signal segments in time and compresses it in the frequency domain.

On read-out the segments are permuted according to a pseudo-random key code from the key generator 66 and converted to analog form with or without time reversal. After such conversion, some of the segments are shifted to different frequency bands thereby to permit the segments to be stacked frequency-wise so as to fill the entire audio frequency spectrum and time domain of the audio signal being transmitted. This composite signal and each segment thereof also has the same time-bandwidth product as the original audio signal and each segment thereof. The composite signal may then be transmitted to a receiving unit which applies a reverse algorithm to the received signal to recover the intelligence in the transmission.

Also, to further increase the difficulty of decoding the transmission, the signal sequences in the different frequency bands may not be stacked into columns of synchronous time-wise segments. Instead, the sequences in adjacent bands may be shifted in time to provide an asynchronous transmission of the signal sequences from the different frequency bands.

By the same token, different commutations and permutations of the aforementioned signal processing steps may be carried out on the signal to be transmitted. Thus the original analog audio signal may be time-divided into full spectrum segments of different time duration as described above. Then, some of these full spectrum segments can be frequency divided into partial spectrum signal sequences. The analog information may then be digitized and stored in memory. The full spectrum segments and the partial spectrum sequences, upon readout, are time-wise reversed and permutated according to the pseudo-random key code from the key generator. Also during readout some of the segments and/or sequences can be expanded or compressed in the time domain, thereby to respectively compress or expand their bandwidth so that each segment retains its original bandwidth-time product.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A privacy communication system comprising
   A. means for splitting a voice signal into a selected number of frequency bands;
   B. means for generating a pseudo-random key word;
   C. means for dividing each said band into segments of different time duration in accordance with the pseudo-random key word;
   D. means for compressing said segments in time and expanding them in frequency by a factor equal to the number of frequency bands into which the voice signal was divided; and
   E. means for transmitting said time-compressed segments, the transmitted signal having substantially the same time-bandwidth product as the voice signal.

2. The system defined in claim 1 wherein the dividing means divides the signal segments in adjacent frequency bands so that they have coincident-in-time boundaries.

3. The system defined in claim 1 wherein the dividing means divides the signal segments in adjacent frequency bands so that they have non-coincident-in-time boundaries.

4. The system defined in claim 1 and further including means for inverting the signal segments from at least one frequency band prior to compressing them timewise.

5. The system defined in claim 1 and further including means for repeatedly changing the key word controlling the encryption of the voice signal.

6. The system defined in claim 1 wherein the splitting means split the voice signal into two said bands.

7. The system defined in claim 1 wherein the compressing means comprise
   A. a memory;
   B. means for writing data from each band in succession into said memory at a selected rate;
   C. means for reading band data comprising successive bands from said memory at said rate so that data from each band is read out at a rate which is a multiple of the number of bands.

8. The system defined in claim 1 wherein the order of transmission of said segments is determined in accordance with said keyword.

9. The system defined in claim 8 and further including means for repeatedly changing the keyword controlling the encryption of the voice signal.

10. The system defined in claim 1 wherein certain segments determined in accordance with said keyword are reversed in time.

11. The system defined in claim 10 and further including means for repeatedly changing the keyword controlling the encryption of the voice signal.

12. The system defined in claim 10 wherein the order of transmission of said segment is determined in accordance with said keyword.

13. A privacy communication system comprising
   A. means for dividing a voice signal into signal segments;
   B. means for expanding said segments in time and compressing them in frequency;
   C. means for generating a pseudo-random key word;
   D. means for shifting said segments in frequency and in time in accordance with the pseudo-random key word so as to stack said segments so that they span a frequency band which is approximately the same as the bandwidth of the voice signal; and
   E. means for transmitting the stacked segments, said transmitted signal having substantially the same time-bandwidth product as the voice signal.

14. The system defined in claim 13 wherein the shifting means shifts the segments so that the stacked segments have coincident-in-time boundaries.

15. The system defined in claim 13 wherein the shifting means shifts the segments so that the stacked segments have non-coincident-in-time boundaries.

16. The system defined in claim 13 and further including means responsive to the key word for reversing selected signal segments in time prior to shifting them in frequency.

17. The system defined in claim 13 wherein the expanding/compressing means includes
   A. a memory;
   B. means for writing the signal segments into said memory at a selected rate; and
   C. means for reading said signal segments out of said memory at a rate slower than the selected rate.

18. The system defined in claim 13 wherein the durations of said signal segments is determined in accordance with said keyword.

19. The system defined in claim 18 and further including means for repeatedly changing the keyword controlling the encryption of the voice signal.

20. The system defined in claim 13 wherein the order of transmission of said segments is determined in accordance with said keyword.

21. The system defined in claim 20 and further including means for repeatedly changing the keyword controlling the encryption of the voice signal.

22. The system defined in claim 13 wherein certain segments determined in accordance with said keyword are reversed in time.

23. The system as defined in claim 22 and further including means for repeatedly changing the keyword controlling the encryption of the voice signal.

24. The system as defined in claim 22 wherein the order of transmission of said segments is determined in accordance with said keyword.

* * * * *